US010190686B2

(12) United States Patent
Nagamachi et al.

(10) Patent No.: US 10,190,686 B2
(45) Date of Patent: Jan. 29, 2019

(54) COVER MEMBER

(71) Applicants: Showa Corporation, Gyoda (JP); FUKOKU BUSSAN CO., LTD., Tokyo (JP)

(72) Inventors: Tomoyoshi Nagamachi, Gyoda (JP); Akira Takada, Gyoda (JP); Shinichi Sutou, Tokyo (JP)

(73) Assignees: SHOWA CORPORATION, Gyoda (JP); FUKOKU BUSSAN CO., LTD., Tokyo (JP)

( * ) Notice: Subject to any disclaimer, the term of this patent is extended or adjusted under 35 U.S.C. 154(b) by 70 days.

(21) Appl. No.: 15/083,523

(22) Filed: Mar. 29, 2016

(65) Prior Publication Data

US 2016/0208917 A1 Jul. 21, 2016

Related U.S. Application Data

(63) Continuation of application No. PCT/JP2014/059725, filed on Apr. 2, 2014.

(30) Foreign Application Priority Data

Oct. 11, 2013 (JP) ................................. 2013-213623

(51) Int. Cl.
  *F16J 3/04* (2006.01)
  *F16F 9/38* (2006.01)
  *F16J 15/52* (2006.01)

(52) U.S. Cl.
  CPC .............. *F16J 3/041* (2013.01); *F16F 9/38* (2013.01); *F16J 3/043* (2013.01); *F16J 15/52* (2013.01)

(58) Field of Classification Search
  CPC .... F16J 3/041; F16J 3/043; F16J 15/52; F16F 9/38
  USPC .......................................................... 277/636
  See application file for complete search history.

(56) References Cited

U.S. PATENT DOCUMENTS 2,876,801 A * 3/1959 November .............. F16L 11/15
138/121
4,079,757 A * 3/1978 Fischer .................... F16J 3/041
138/121

(Continued)

FOREIGN PATENT DOCUMENTS

CN 103154560 A 6/2013
DE 2845243 A 4/1980

(Continued)

OTHER PUBLICATIONS

International Search Report dated Jun. 24, 2014 for the corresponding PCT Application No. PCT/JP2014/059725.

(Continued)

*Primary Examiner* — Nathan Cumar
(74) *Attorney, Agent, or Firm* — Leason Ellis LLP

(57) ABSTRACT

A cover member is to cover a cylinder and includes a plurality of peaks, a plurality of valleys, and coupling portions, which couple the plurality of peaks to the plurality of valleys. The cover member is expandable and contractable in an alignment direction in which the plurality of peaks and the plurality of valleys are aligned. Each peak of the plurality of peaks includes a depression depressed from an apex of the peak in a direction toward the cylinder, and each valley of the plurality of valleys includes a protrusion protruding from a bottom of the valley in a direction opposite to the cylinder.

10 Claims, 10 Drawing Sheets

(56) References Cited

U.S. PATENT DOCUMENTS

| | | | | |
|---|---|---|---|---|
| 5,176,390 A | * | 1/1993 | Lallement | F16D 3/845 |
| | | | | 277/636 |
| 5,308,091 A | * | 5/1994 | Mihalcin | F16J 3/041 |
| | | | | 277/636 |
| 5,599,029 A | * | 2/1997 | Umeno | F16D 3/845 |
| | | | | 277/636 |
| 6,042,092 A | * | 3/2000 | Shibata | F16F 9/38 |
| | | | | 267/122 |
| 7,670,535 B2 | * | 3/2010 | Renzo | B29C 45/2618 |
| | | | | 264/328.1 |
| 2012/0186923 A1 | | 7/2012 | Buma | |
| 2012/0319338 A1 | | 12/2012 | Takada et al. | |

FOREIGN PATENT DOCUMENTS

| | | | |
|---|---|---|---|
| EP | 0464984 | A | 1/1992 |
| FR | 2703749 | A | 10/1994 |
| JP | 59-152285 | A | 10/1984 |
| JP | 59-180049 | U | 12/1984 |
| JP | 10-267124 | A | 10/1998 |
| JP | 2013-002507 | A | 1/2013 |
| WO | WO-2013-072958 | A | 5/2013 |

OTHER PUBLICATIONS

Office Action dated Nov. 28, 2016 for the corresponding Chinese Patent Application No. 201480056179.0.
Office Action dated Jan. 30, 2018 for the corresponding Chinese Patent Application No. 201480056179.0.

* cited by examiner

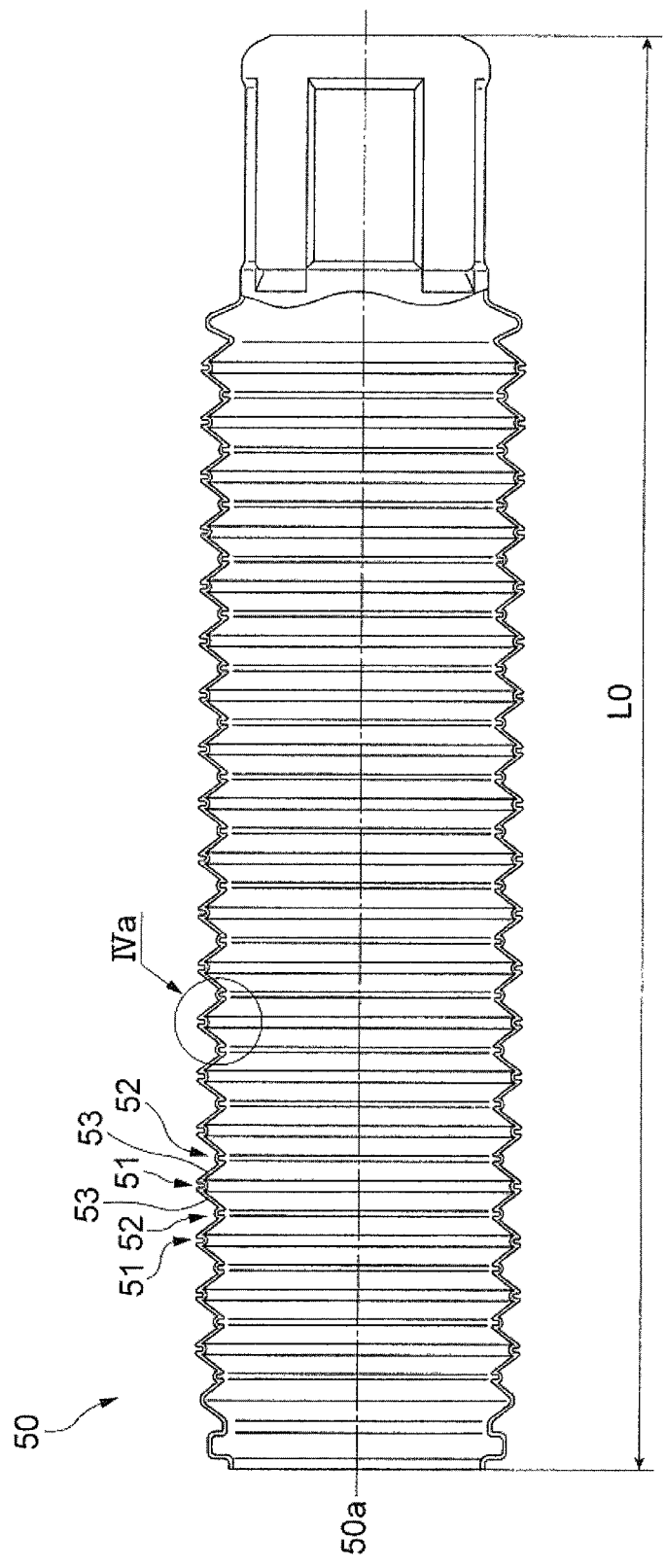

COVER MEMBER

CROSS REFERENCE TO RELATED APPLICATION

This is a continuation of International Application No. PCT/JP2014/059725 filed on Apr. 2, 2014, and claims priority from Japanese Patent Application No. 2013-213623 filed on Oct. 11, 2013, the entire disclosures of which are incorporated herein by reference.

BACKGROUND

1. Technical Field

The present invention relates to a cover member.

2. Related Art

Cover members have been used in, for example, hydraulic shock absorbers provided in suspensions (suspensions) to cover and protect piston rods and cylinders on their outer circumferences. For example, patent document 1 (JP-A-10-267124) recites a bellows structure (cover member). A cross-sectional view of the bellows structure shows that the bellows structure includes a series of alternating peaks and valleys between mounting portions at both ends. An example of the bellows structure (cover member) is a cover that surrounds a cylinder on the inner side of a spring.

SUMMARY

It is difficult to make uniform the thickness of a cover member made up of a series of alternating peaks and valleys. This may lead to what is called bowing, which is a phenomenon of the cover member bending in a direction crossing the compression direction when the cover member is compressed. The bowing phenomenon may cause the cover member to come into contact with the cylinder covered by the cover member or with the spring outside the cover member, creating a possibility of damage. It is an object of the present invention to provide a cover member that prevents bowing from occurring.

In order to realize the above-described object, a cover member according to at least one embodiment of the present invention is to cover an object and includes a plurality of peaks, a plurality of valleys, and a coupling portion coupling the plurality of peaks to the plurality of valleys. The cover member is expandable and contractable in an alignment direction in which the plurality of peaks and the plurality of valleys are aligned. Each peak of the plurality of peaks includes a depression depressed from an apex of the peak in a direction toward the object, and each valley of the plurality of valleys includes a protrusion protruding from a bottom of the valley in a direction opposite to the object. When the cover member contracts in the alignment direction, the depression of the peak is deformed to enlarge the opening of the depression, and of the valley is deformed to enlarge the base of the protrusion. This ensures a larger restoring force than when the present invention is not employed, making bowing difficult to occur.

According to the at least one embodiment of the present invention, the cover member prevents bowing from occurring.

BRIEF DESCRIPTION OF DRAWINGS

FIG. 3 illustrates a schematic configuration of a dust cover.

DESCRIPTION OF EMBODIMENTS

By referring to the accompanying drawings, embodiments of the present invention will be described in detail below.

Figure 1:
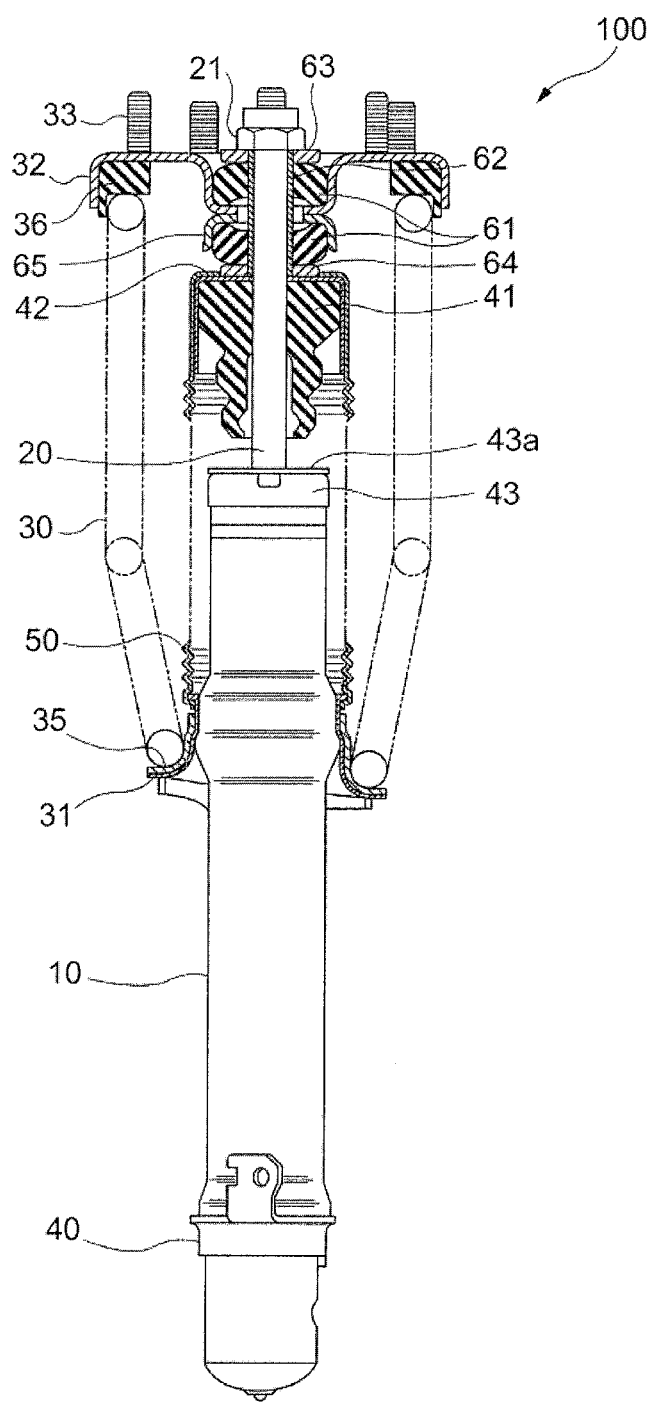
FIG. 1 illustrates a schematic configuration of a suspension according to an embodiment.

FIG. 1 illustrates a schematic configuration of a suspension 100 according to this embodiment.

As illustrated in FIG. 1, the suspension 100 includes: a cylinder 10, which contains an damper (not illustrated); a piston rod 20, which supports a piston (not illustrated) accommodated in the cylinder 10; and a spring 30, which is disposed outside the piston rod 20. The piston rod 20 is a hollow cylindrical or solid cylindrical member with the piston mounted on one end in the center line direction of the hollow cylinder or the solid cylinder and with a nut 21 mounted on another end in the center line direction of the hollow cylinder or the solid cylinder. In the following description, the center line direction of the hollow cylinder or the solid cylinder of the piston rod 20 will be occasionally referred to simply as "center line direction". Also, the one end in the center line direction will be occasionally referred to as "lower end", and the other end in the center line direction will be occasionally referred to as "upper end".

The suspension 100 includes: a lower spring sheet 31, which is mounted on the outer circumference of the cylinder 10 to support the spring 30 at its lower end; and an upper spring sheet 32, which is mounted on the outer circumference of the piston rod 20 on its other end side in the center line direction to support the spring 30 at its upper end. A lower sheet rubber 35 is interposed between the lower end of the spring 30 and the lower spring sheet 31, and an upper sheet rubber 36 is interposed between the upper end of the spring 30 and the upper spring sheet 32.

The suspension 100 includes a wheel side mounting portion 40, which is disposed under the cylinder 10. On the upper spring sheet 32, bolts 33 are mounted so as to mount the suspension 100 to the vehicle body.

The suspension 100 also includes: a bump rubber 41, which is press fitted on the outer circumference of the piston rod 20, which sticks out of the cylinder 10; and a bump rubber cup 42, which is disposed on the outer circumference of the bump rubber 41. The suspension 100 also includes a bump stopper cap 43, which is mounted on a sliding contact portion of the cylinder 10 in relation to the piston rod 20. On the bump stopper cap 43, a cap plate 43a is mounted for the bump rubber 41 to collide with at the time of full compression of the suspension 100.

The suspension 100 also includes a dust cover 50, which has an upper end mounted on the outer circumference of the bump rubber cup 42 and a lower end mounted on the lower spring sheet 31 to serve as an exemplary cover member that covers the outer circumferences of the cylinder 10 and the piston rod 20 between the upper end and the lower end. The lower end of the dust cover 50 is fastened to the lower spring sheet 31 with, for example, a fastening ring (not illustrated) and a screw.

The suspension 100 also includes a plurality of (two in this embodiment) mount rubbers 61, which are arranged on top of each other in the vertical direction at the upper end of the piston rod 20 to absorb vibration; a mount color 62, which has a hollow cylindrical shape disposed through the plurality of mount rubbers 61; and an upper washer 63 and a lower washer 64, which hold the plurality of mount rubbers 61 between the upper washer 63 and the lower washer 64 in the vertical direction. The upper mount rubber 61 of the plurality of mount rubbers 61 is inserted through a depression of the upper spring sheet 32. The depression is formed on the upper side of the upper spring sheet 32. The lower mount rubber 61 has its upper side and outer circumference covered with a mount rubber cup 65, which is disposed under the upper spring sheet 32.

Figure 2A:
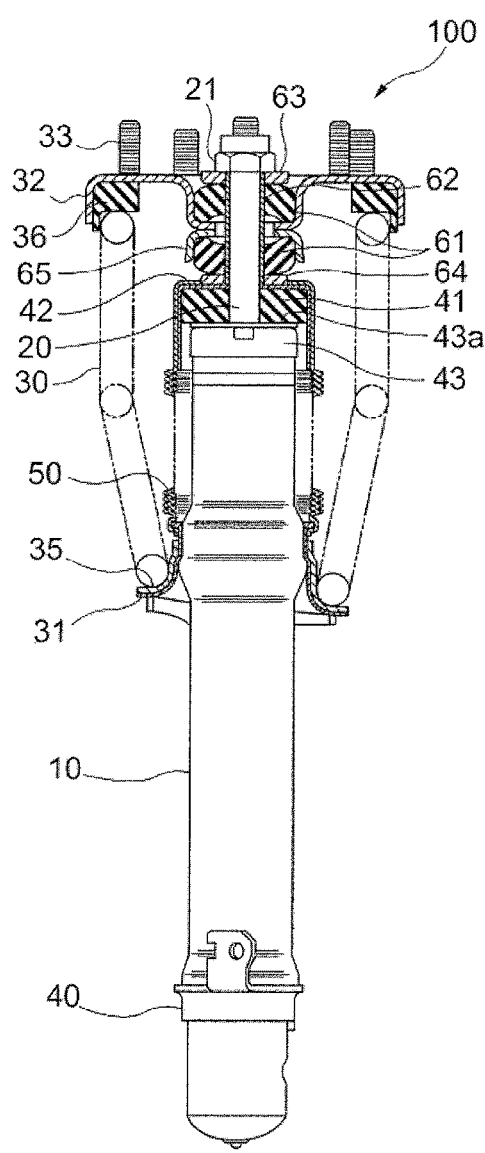
FIG. 2A illustrates a contraction state of the suspension.
Figure 2B:
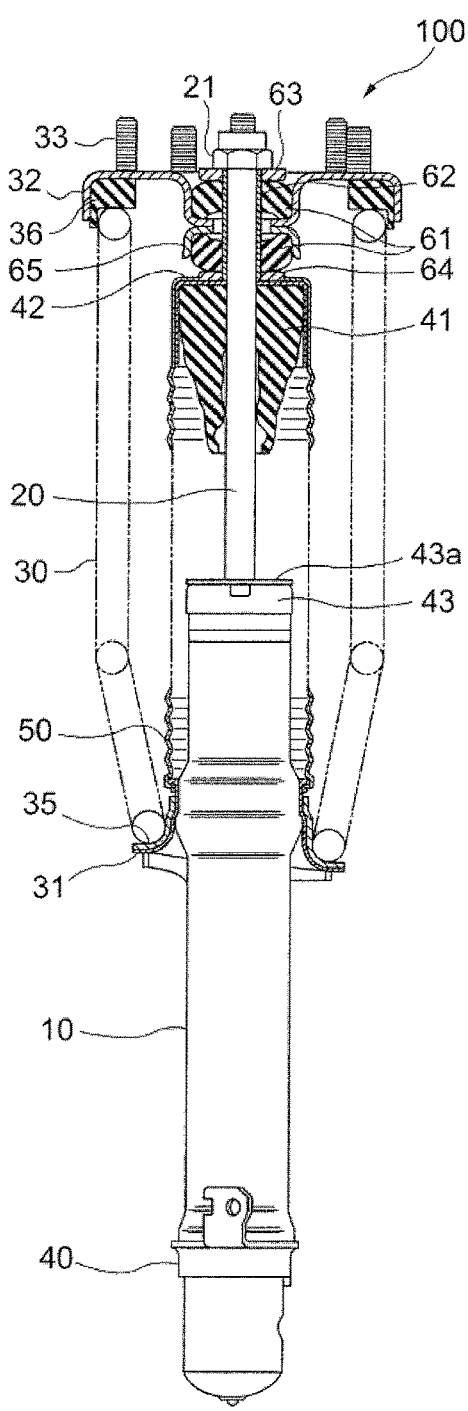
FIG. 2B illustrates an expansion state of the suspension.

FIG. 2A illustrates a contraction state of the suspension 100, and FIG. 2B illustrates an expansion state of the suspension 100.

The suspension 100 thus configured changes between the contraction state illustrated in FIG. 2A and the expansion state illustrated in FIG. 2B to absorb impact from a ground surface using the spring 30 and to damp the expansion and contraction vibration of the spring 30 using the damper contained in the cylinder 10. In this manner, the suspension 100 serves a function of a damper to block transmission of the influence of the roughness of the ground surface to the vehicle body and a function to keep the vehicle body to the ground surface. This configuration improves riding comfortability and steering maneuverability of the vehicle.

Next, the dust cover 50 will be described in detail.

Figure 4A:
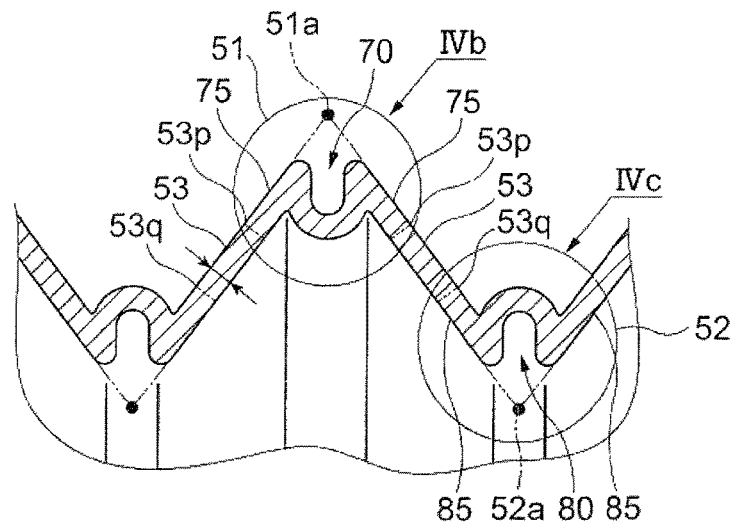
FIG. 4A is an enlarged view of part IVa of FIG. 3.
Figure 4B:
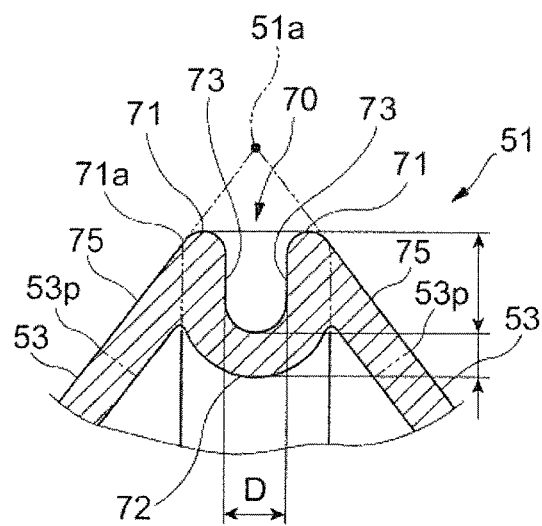
FIG. 4B is an enlarged view of part IVb of FIG. 4A.
Figure 4C:
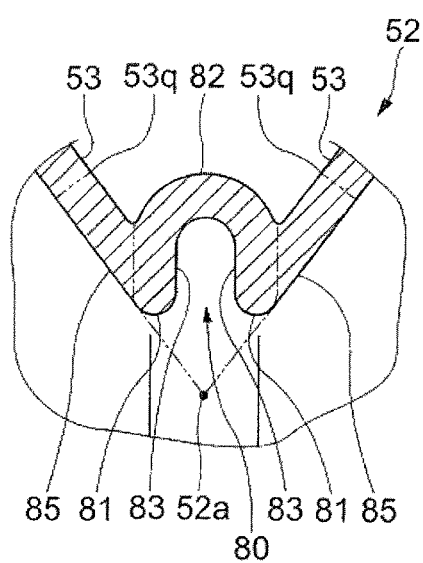
FIG. 4C is an enlarged view of part IVc of FIG. 4A.

FIG. 3 is a cross-sectional view of the dust cover 50 illustrating a schematic configuration of the dust cover 50. FIG. 4A is an enlarged view of part IVa of FIG. 3. FIG. 4B is an enlarged view of part IVb of FIG. 4A. FIG. 4C is an enlarged view of part IVc of FIG. 4A.

The dust cover 50 is a bellows shaped member, and as illustrated in FIGS. 1 and 2, has an upper end covering the outer circumference of the bump rubber cup 42 and a lower end mounted on the lower spring sheet 31. The dust cover 50 is disposed between the spring 30, the cylinder 10, and the piston rod 20 to cover the outer circumferences of the cylinder 10 and the piston rod 20.

The dust cover 50 includes: a plurality of peaks 51 and a plurality of valleys 52, which alternate in the direction of a center line 50a; and a coupling portion 53, which couples one peak 51 and one valley 52 to each other. While in FIG. 3 the plurality of peaks 51 and the plurality of valleys 52 are illustrated in a cross-section across the dust cover 50 including the center line 50a, the plurality of peaks 51 and the plurality of valleys 52 are formed over the entire circumference of the dust cover 50. The dust cover 50 is expandable and contractable in the alignment direction of the plurality of peaks 51 and in the alignment direction of the plurality of valleys 52 (which are the direction of the center line 50a). The dust cover 50 is also bendable in a direction crossing the center line 50a. In the state in which the dust cover 50 is mounted on the suspension 100, the dust cover 50 is disposed with the center line 50a of the dust cover 50 superposed on the center line of the hollow cylinder or the solid cylinder of the piston rod 20. Thus, the plurality of peaks 51 and the plurality of valleys 52 of the dust cover 50 are aligned in the direction of the center line of the hollow cylinder or the solid cylinder of the piston rod 20, enabling the dust cover 50 to expand and contract in the center line direction (see FIG. 2).

As illustrated in FIG. 4A, the peak 51 includes: a depression 70, which is depressed inward (toward the center line 50a) from an apex 51a of the peak 51 (which is the portion at which extensions of the outer surfaces of adjacent two coupling portions 53 meet (the outer surfaces are the lines defining the outer shape of the dust cover 50 in the cross-sectional illustrated in FIG. 3)); and a connection portion 75, which connects the depression 70 and the coupling portion 53 to each other. As illustrated in FIG. 4A, the valley 52 includes: a protrusion 80, which protrudes outward (in a direction opposite to the center line 50a) from a bottom 52a of the valley 52 (which is the portion at which extensions of the inner surfaces of adjacent two coupling portions 53 meet (the inner surfaces are the lines defining the inner shape of the dust cover 50 in the cross-sectional illustrated in FIG. 3); and a connection portion 85, which connects the protrusion 80 and the coupling portion 53 to each other. As illustrated in FIG. 4A, the coupling portion 53 is a linear portion with one end 53p coupled to the connection portion 75 of the peak 51 and another end 53q coupled to the connection portion 85 of the valley 52. In this manner, the coupling portion 53 couples the peak 51 and the valley 52 to each other. The cross-sectional shape of the dust cover 50 illustrated in FIG. 4A is formed over the entire circumference of the dust cover 50 in the circumferential direction.

As illustrated in FIG. 4B, the depression 70 of the peak 51 has a U shaped cross-section parallel to the center line 50a, and includes: edges 71, which define the upper edges of the two sides of the U shape; a bottom 72 of the U shape; and sides 73, which are between the edges 71 and the bottom 72. As illustrated in FIG. 4B, the connection portion 75 connects an outer portion of the depression 70 and the coupling portion 53 to each other.

As illustrated in FIG. 4B, each of the edges 71 is an approximately semi-circular portion. The bottom 72 is an arc shaped portion of approximately 180-degree center angle. In other words, the bottom 72 is a semi-circular portion. Each of the sides 73 is an approximately linear portion that couples the edge 71 and one end of the bottom 72 to each other.

The connection portion 75 is an approximately linear portion that couples outer portions of the edge 71, the bottom 72, and the side 73 to the coupling portion 53. A length of Lm0, described later, is set from the apex 51a to the portion at which the connection portion 75 and the coupling portion 53 are connected to each other, in other words, to the one end 53p of the coupling portion 53. The portion at which the connection portion 75 and the coupling portion 53 are connected to each other is a boundary between the peak 51 and the coupling portion 53.

As illustrated in FIG. 4C, the protrusion 80 of the valley 52 has a mountain shaped (inverse-U shaped) cross-section parallel to the center line 50a, and includes: bases 81, which are the bases of the mountain shape; an apex 82 of the mountain shape; and sides 83, which are between the bases 81 and the apex 82. As illustrated in FIG. 4C, the connection portion 85 connects an outer portion of the protrusion 80 and the coupling portion 53 to each other.

As illustrated in FIG. 4C, each of the bases 81 is an approximately semi-circular portion. The apex 82 arc shaped portion of approximately 180-degree center angle. In other words, the apex 82 is a semi-circular portion. Each of the sides 83 is an approximately linear portion that couples the base 81 and one end of the apex 82.

The connection portion 85 is an approximately linear portion that couples outer portions of the base 81, the apex 82, and the side 83 to the coupling portion 53. A length of Lb0, described later, is set from the bottom 52a to the portion at which the connection portion 85 and the coupling portion 53 are connected to each other, in other words, to the other end 53q of the coupling portion 53. The portion at which the connection portion 85 and the coupling portion 53 are connected to each other is a boundary between the valley 52 and the coupling portion 53.

Examples of the material of the dust cover 50 include rubber, cloth, elastically deformable synthetic resin (TPE), and a synthetic resin made of polypropylene (PP) and ethylene-propylene-diene (EPDM) rubber. Examples of the method of molding the dust cover 50 include blow molding and injection molding.

Figure 5:
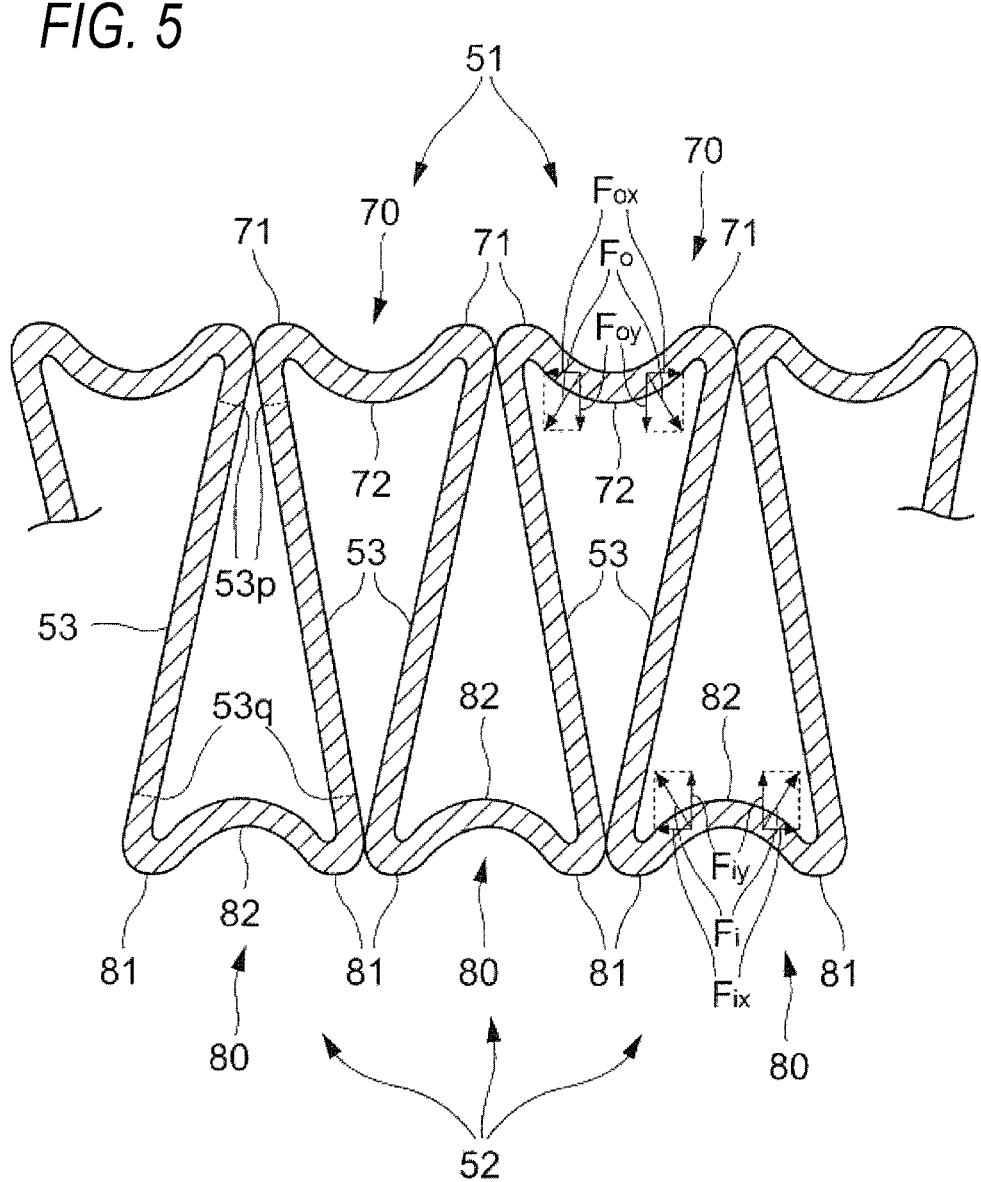
FIG. 5 is a partially cross-sectional view of the dust cover according to this embodiment in its fully contracting state.

FIG. 5 is a partially cross-sectional view of the dust cover 50 according to this embodiment in its fully contracting state.

The dust cover 50 according to this embodiment covers the outer circumferences of the cylinder 10 and the piston rod 20, and includes: the plurality of peaks 51; the plurality of valleys 52; and the coupling portions 53, which couple the plurality of peaks 51 and the plurality of valleys 52 to each other. The dust cover 50 is expandable and contractable in the alignment direction in which the plurality of peaks 51 and the plurality of valleys 52 are aligned. Each peak 51 of the plurality of peaks 51 includes the depression 70, which is depressed from the apex 51a of the peak 51 in a direction toward the cylinder 10 and the piston rod 20. Each valley 52 of the plurality of valleys 52 includes the protrusion 80, which protrudes from the bottom 52a of the valley 52 in a direction opposite to the cylinder 10 and the piston rod 20. When the dust cover 50 contracts in the alignment direction, the depression 70 of the peak 51 is deformed to enlarge the opening of the depression 70, and the protrusion 80 of the valley 52 is deformed to enlarge the base of the protrusion 80.

The depression 70 of the peak 51 includes the bottom 72, which has an arc shape. When the dust cover 50 contracts in the alignment direction, the depression 70 is deformed to decrease the curvature of the bottom 72 of the depression 70. The protrusion 80 of the valley 52 includes the apex 82, which has an arc shape. When the dust cover 50 contracts in the alignment direction, the protrusion 80 is deformed to decrease the curvature of the apex 82 of the protrusion 80. Before the dust cover 50 contracts in the alignment direction, the gap between the coupling portions 53 on both sides of the peak 51 is smaller near the peak 51 than the gap between the coupling portions 53 near the valley 52. When the dust cover 50 contracts in the alignment direction, the gap between the coupling portions 53 is larger near the peak 51 than the gap between the coupling portions 53 near the valley 52. In the state before the dust cover 50 contracts in the alignment direction and in the state after the dust cover 50 contracts in the alignment direction, the coupling portion 53 is linear.

Specifically, when the dust cover 50 contracts in the direction of the center line 50a, the depression 70 of the peak 51 is deformed to decrease the curvature of the bottom 72, that is, deformed to enlarge the gap between the edges 71 as illustrated in FIG. 5. At the same time, the depression 70 is deformed to make the other ends 53q of the coupling portions 53 on both sides of the peak 51 closer to each other. That is, when the dust cover 50 contracts in the direction of the center line 50a, force Fo illustrated in FIG. 5 acts on any point of the bottom 72 of the depression 70 of the peak 51. Force Fo can be resolved into component Fox, which is in the direction of the center line 50a, and component Foy, which is in the direction orthogonal to the direction of the center line 50a. From a viewpoint throughout (over the entire circumference of) the peak 51, component Fox, which is in the direction of the center line 50a, acts on the bottom 72 to enlarge the gap between the edges 71.

Also when the dust cover 50 contracts in the direction of the center line 50a, the protrusion 80 of the valley 52 is deformed to decrease the curvature of the apex 82, that is, deformed to enlarge the gap between the bases 81 as illustrated in FIG. 5. At the same time, the protrusion 80 is deformed to make the one ends 53p of the coupling portions 53 on both sides of the valley 52 closer to each other. That is, when the dust cover 50 contracts in the direction of the center line 50a, force Fi illustrated in FIG. 5 acts on any point of the apex 82 of the protrusion 80 of the valley 52. Force Fi can be resolved into component Fix, which is in the direction of the center line 50a, and component Fiy, which is in the direction orthogonal to the direction of the center line 50a. From a viewpoint throughout (over the entire circumference of) the valley 52, component Fix, which is in the direction of the center line 50a, acts on the apex 82 to enlarge the gap between the bases 81.

Specifically, when the dust cover 50 contracts in the alignment direction of the plurality of peaks 51 and the plurality of valleys 52, the peak 51 generates a force in a direction perpendicular to the shape of the depression 70 with a supporting point on a part of the depression 70 so as to enlarge the opening of the depression 70. At the same time, the valley 52 generates a force in a direction perpendicular to the shape of the protrusion 80 with a supporting point on a part of the protrusion 80 so as to enlarge the base of the protrusion 80.

When the dust cover 50 contracts in the alignment direction (the direction of the center line 50a), the width of the peak 51 in the alignment direction is approximately equal to the width of the valley 52 in the alignment direction.

When the dust cover 50 contracts to cause the deformation of decreasing the curvature of the bottom 72 of the depression 70 of the peak 51, a force acts on the dust cover 50 in a direction in which the curvature of the bottom 72 returns to the original curvature. That is, a force acts in a direction in which the other ends 53q of the coupling portions 53 on both sides of the peak 51 move away from each other. When the dust cover 50 contracts to cause the deformation of decreasing the curvature of the apex 82 of the protrusion 80 of the valley 52, a force acts on the dust cover 50 in a direction in which the curvature of the apex 82 returns to the original curvature. That is, a force acts in a direction in which the one ends 53p of the coupling portions 53 on both sides of the valley 52 move away from each other. In other words, a force acts in a direction in which the other ends 53q of the coupling portions 53 on both sides of the peak 51 move away from each other.

Next, advantages of the dust cover 50 according to this embodiment will be further described by comparison with first and second comparative examples.

First, simply stated, the advantageous effects of the dust cover 50 according to this embodiment are directed to prevention of bowing of the dust cover because: (A) the size in the radial direction reduces causing rigidity to improve (as compared with the first comparative example); and (B) the number of peaks and valleys of the dust cover reduce causing the expansion and contraction direction lengths to reduce at the time when the dust cover expands and contracts (as compared with the second comparative example). These advantageous effects will be described in detail below.

Figure 6A:
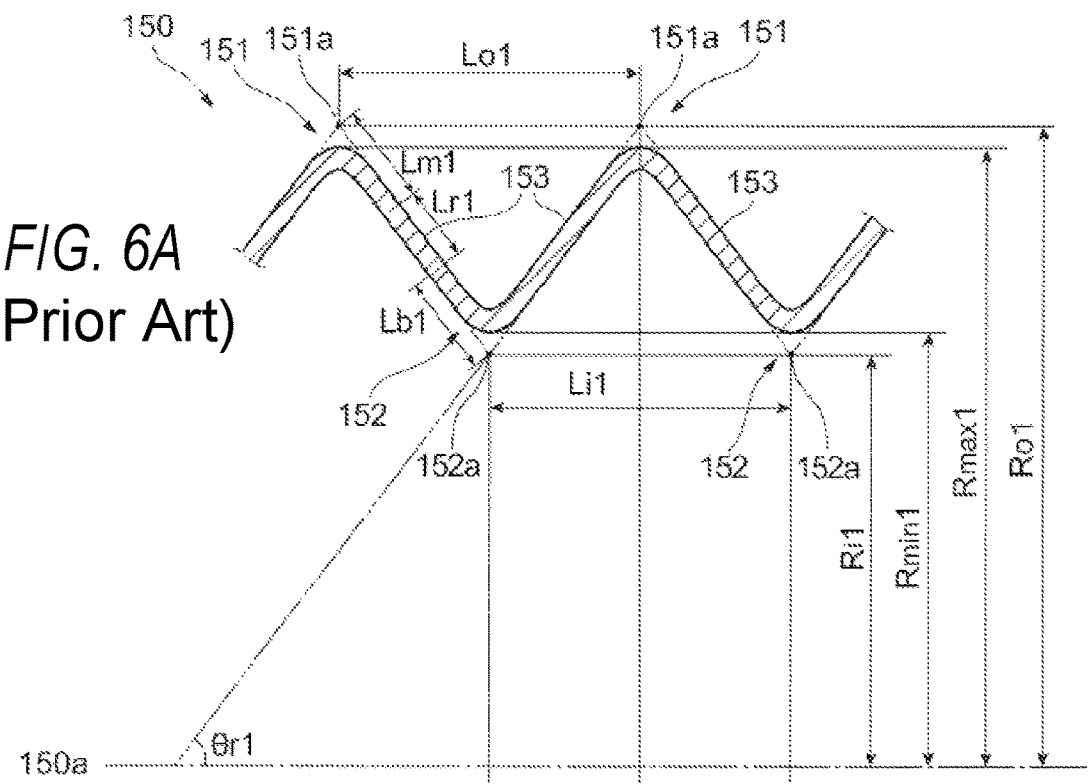
FIG. 6A is an enlarged cross-sectional view of a dust cover according to a first comparative example.
Figure 6B:
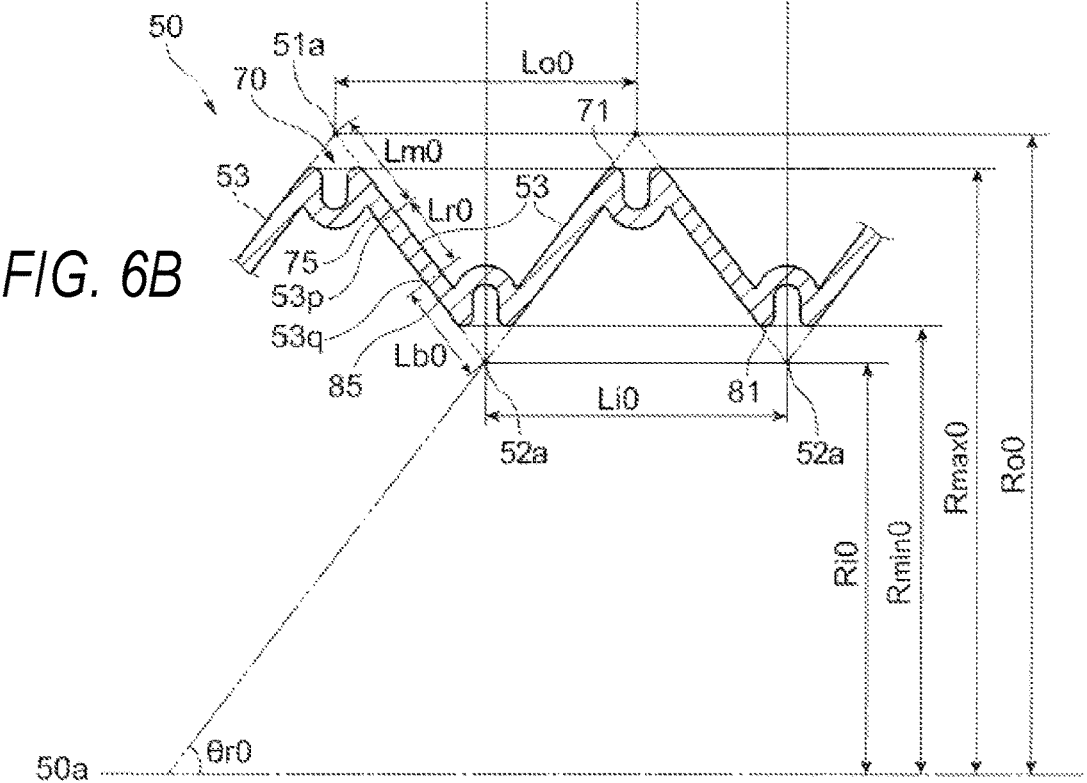
FIG. 6B is an enlarged cross-sectional view of the dust cover according to the embodiment.
Figure 7:
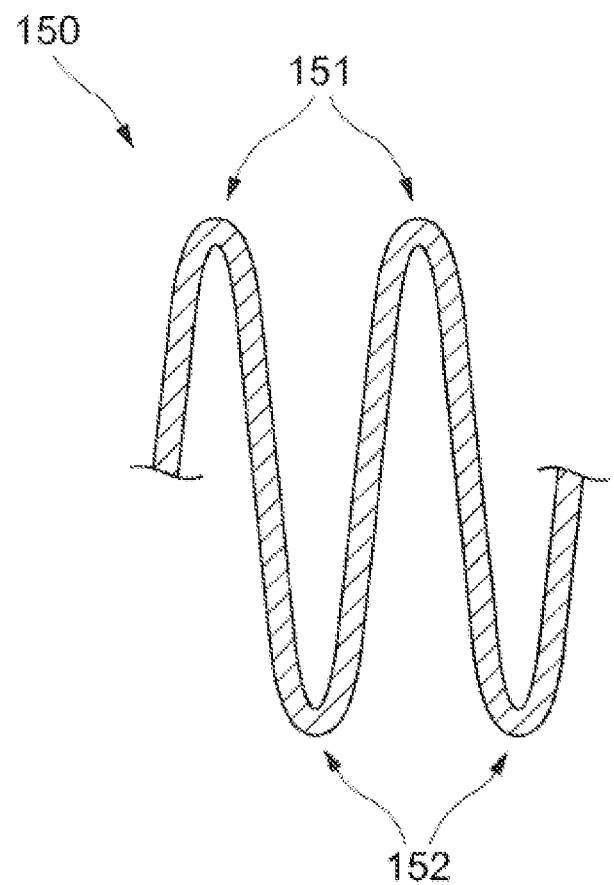
FIG. 7 illustrates the dust cover according to the first comparative example in its fully contracting state.

(A) Prevention of Bowing of the Dust Cover 50 Realized by a Reduction in the Size in the Radial Direction FIG. 6A is an enlarged cross-sectional view of a dust cover 150 according to the first comparative example. FIG. 6B is an enlarged cross-sectional view of the dust cover 50 according to this embodiment. FIG. 7 illustrates the dust cover 150 according to the first comparative example in its fully contracting state.

The dust cover 150 according to the first comparative example includes a plurality of peaks 151, a plurality of valleys 152, and a coupling portion 153 (similarly to the dust cover 50 according to this embodiment). The dust cover 150 according to the first comparative example, however, is different from the dust cover 50 according to this embodiment in that the peak 151 has no portion that is depressed inward from the apex 151a and that the valley 152 has no portion that protrudes outward from the bottom 152a.

In the dust cover 150 according to the first comparative example and the dust cover 50 according to this embodiment, distances Ro1 and Ro0 respectively from the center lines 150a and 50a to the apexes 151a and 51a are the same, distances Ri1 and Ri0 respectively from the center lines 150a and 50a to the bottoms 152a and 52a are the same, lengths Lr1 and Lr0 respectively of the coupling portions 153 and 53 are the same, distances Lm1 and Lm0 respectively from the apexes 151a and 51a to the ends of the peaks 151 and 51 are the same, and distances Lb1 and Lb0 respectively from the bottoms 152a and 52a to the ends the valley 152 and 52 are the same.

Also in the dust cover 150 according to the first comparative example and the dust cover 50 according to this embodiment, the distances between adjacent peaks 151 and adjacent peaks 51 (distances Lo1 and Lo0 respectively between the apexes 151a and between the apexes 51a) are the same, the distances between adjacent valleys 152 and between adjacent valleys 52 (distance Li1 and Li0 respectively between the bottoms 152a and between the bottoms 52a) are the same, and inclination θr1 of the coupling portion 153 relative to the center line 150a and inclination θr0 of the coupling portion 53 relative to the center line 50a are the same.

In the dust cover 50 according to this embodiment, the peak 51 has the depression 70, which is depressed inward from the apex 51a, and the valley 52 has the protrusion 80, which protrudes outward from the bottom 52a. As a result, as illustrated in FIG. 6, distance Rmax0, which is from the center line 50a to the distal end of the edge 71 of the peak 51, which is the outermost portion of the dust cover 50 according to this embodiment, is smaller than distance Rmax1, which is from the center line 150a to the distal end of the peak 151, which is the outermost portion of the dust cover 150 according to the first comparative example. Also, distance Rmin0, which is to the distal end of the base 81 of the valley 52, which is the innermost portion, is larger than distance Rmin1, which is to the distal end of the valley 152, which is the innermost portion.

As seen from the above comparison, the dust cover 50 according to this embodiment is higher in rigidity than the dust cover 150 according to the first comparative example. This configuration makes the dust cover 50 according to this embodiment more difficult to deform when the dust cover 50 according to this embodiment and the dust cover 150 according to the first comparative example receive the same amount of compressive load in the direction of the center line 50a. Thus, bowing is more difficult to occur in the dust cover 50 according to this embodiment than in the dust cover 150 according to the first comparative example if, for example, the dust cover 50 increases in size in the radial direction or if a large amount of force acts in the directions of the center lines 50a and 150a.

The total length of the coupling portion 53, the connection portion 75, and the connection portion 85, which are thinner portions of the dust cover 50 according to this embodiment, is smaller than the length from the distal end of the peak 151 to the distal end of the valley 152, which are thinner portions of the dust cover 150 according to the first comparative example. Also in the dust cover 50 according to this embodiment, the portion at which the depression 70 and the connection portion 75 (of the peak 51) are in contact with each other and the portion at which the protrusion 80 and the connection portion 85 (of the valley 52) are in contact with each other are thicker than the thickness of the coupling portion 53.

By shortening the coupling portion 53 and other thinner portions and by thickening the peak 51 and the valley 52, variations in the thickness of the dust cover 50 (at the time of blow molding) reduce, resulting in prevention of bowing of the dust cover 50.

Also, the dust cover 50 according to this embodiment ensures a larger clearance between the dust cover 50 and members disposed on the outside and inside of the dust cover 50 (for example, the cylinder 10). As a result, the dust cover 50 avoids contact with the members disposed on the outside and inside of the dust cover 50.

In other words, the dust cover 50 is smaller in outer shape and larger in inner shape. This provides greater degrees of design freedom, such as enlarging the members disposed on the outside of the dust cover 50 and the members disposed on the inside of the dust cover 50.

Figures 8A, 8B:
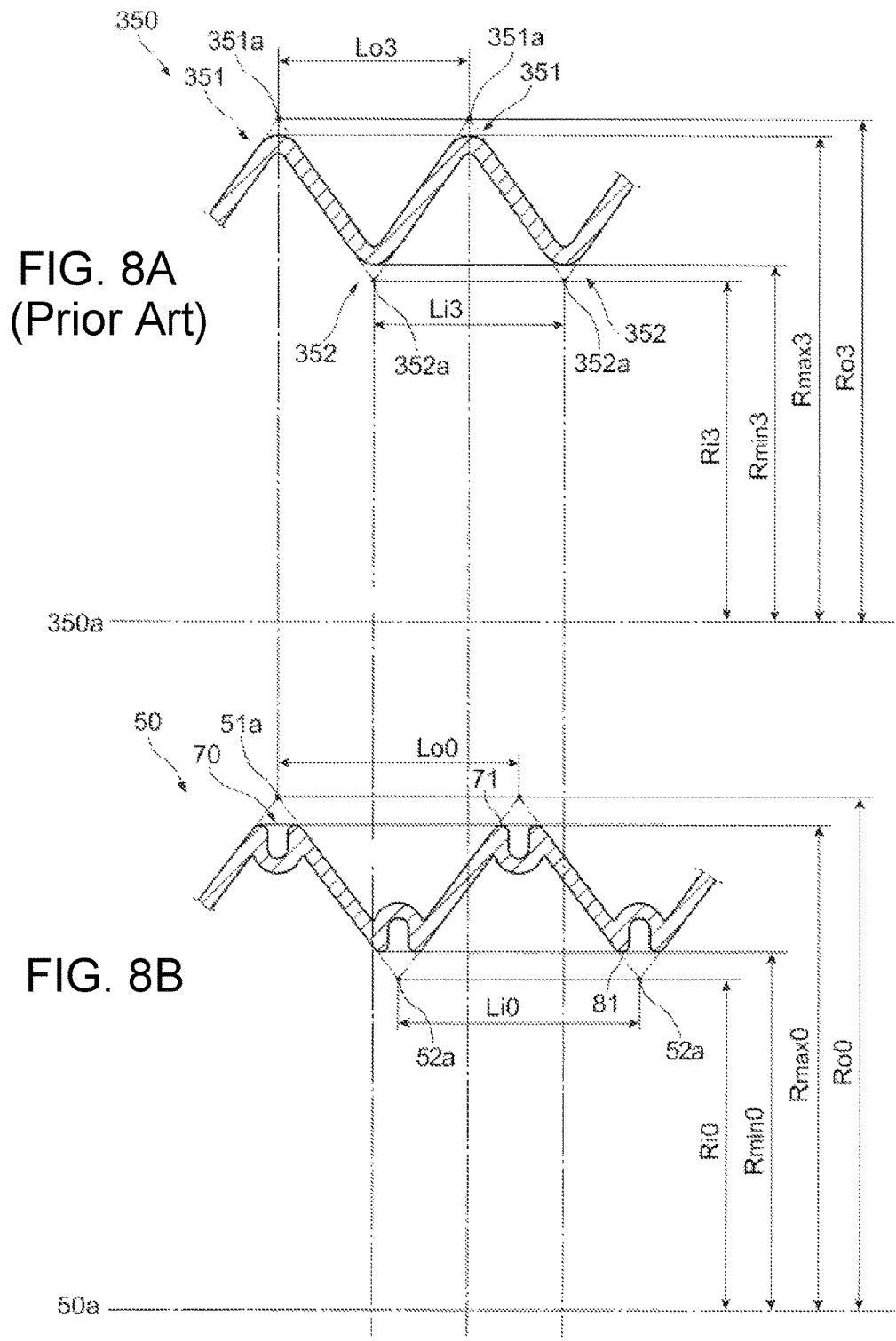
FIG. 8A is a cross-sectional view of a dust cover according to a second comparative example.
FIG. 8B is a cross-sectional view of the dust cover according to the embodiment.

(B) Prevention of Bowing of the Dust Cover Realized by Reduction in Expansion and Contraction Direction Lengths at the Time when the Dust Cover Expands and Contracts FIG. 8A is a cross-sectional view of a dust cover 350 according to the second comparative example.

The dust cover 350 according to the second comparative example is different from the dust cover 150 according to the first comparative example in the following respects.

Distance Lo0, which is between adjacent peaks 51 of the dust cover 50 according to this embodiment (more specifically, distance between adjacent apexes 51a), is larger than distance Lo3, which is between adjacent peaks 351, that is, adjacent apexes 351a, of the dust cover 350 according to the second comparative example.

Similarly, distance Li0, which is between adjacent valleys 52, that is, adjacent bottoms 52a, of the dust cover 50 according to this embodiment is larger than the distance between adjacent valleys 352, that is, distance Li3, which is between adjacent bottoms 352a, of the dust cover 350 according to the second comparative example.

This ensures a reduced number of peaks 51 and valleys 52 in the dust cover 50 according to this embodiment as compared with the number of peaks 351 and valleys 352 in the dust cover 350 according to the second comparative example, under the assumption that the total length, L0 (see FIG. 3), of the dust cover 50 according to this embodiment is the same as the total length (not illustrated) of the dust cover 350 according to the second comparative example.

In short, when the dust cover 50 fully contracts, the dust cover 50 has a reduced length in the expansion and contraction directions by the amount of reduction in the number of peaks 51 and valleys 52 of the dust cover 50.

As a result, the total length L0 of the dust cover 50 according to this embodiment in its fully contracting state is smaller than the total length of the dust cover 350 according to the second comparative example in its fully contracting state.

As has been described hereinbefore, the dust cover 50 according to this embodiment is more difficult to deform in the direction of the center line 50a than the dust cover 350 according to the second comparative example, and bowing is more difficult to occur in the dust cover 50 according to this embodiment than in the dust cover 350 according to the second comparative example.

FIG. 8B an enlarged cross-sectional view of the dust cover 50 according to one embodiment of the present invention.

FIG. 9A, FIG. 9B, FIG. 10A, and FIG. 10B are cross-sectional views of dust covers 50 according to other embodiments.

Figure 9A:
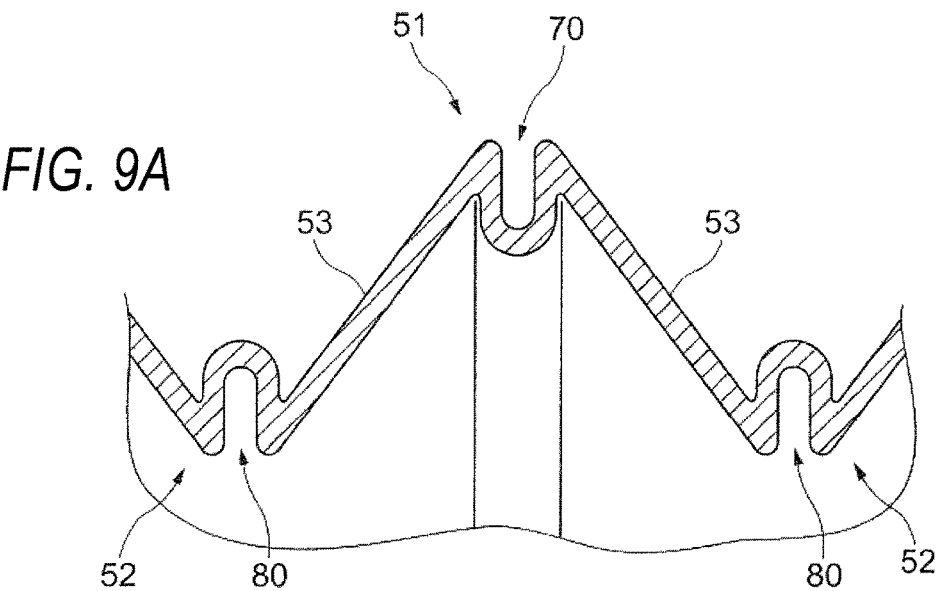
FIGS. 9A and 9B are cross-sectional views of dust covers according to other embodiments.
Figure 9B:
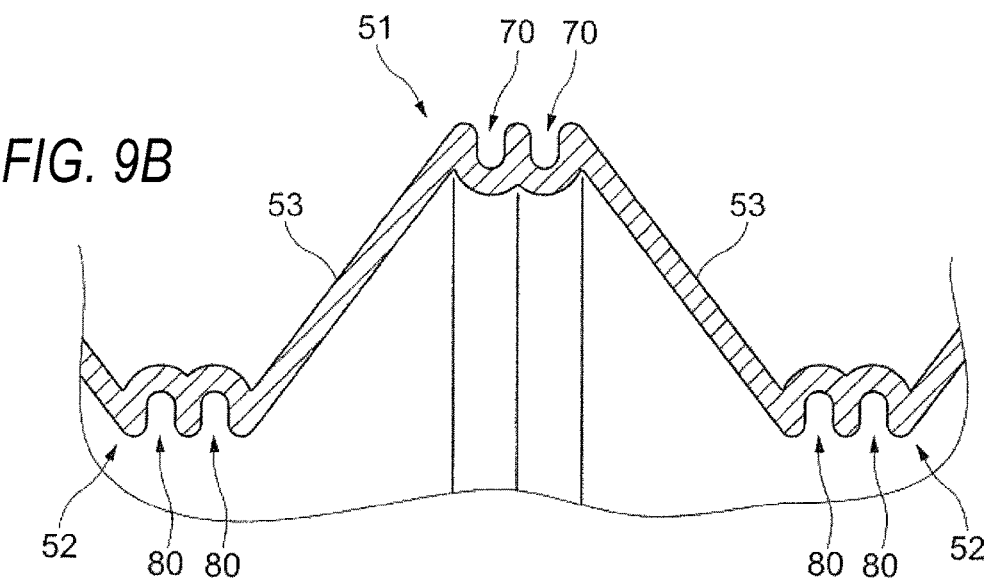

In the dust cover 50 according to this embodiment, there is no particular limitation to the positions, sizes, angles, and other parameters of the peak 51 and the valley 52 (more specifically, the depression 70 and the protrusion 80, respectively). For example, as illustrated in FIG. 9A, the depression 70 of the peak 51 may be deeper in depth, and the protrusion 80 of the valley 52 may be higher in height. As illustrated in FIG. 9B, the depression 70, which is depressed inward from the apex 51a of the peak 51, may be provided in plural, and the protrusion 80, which protrudes outward from the bottom 52a of the valley 52, may be provided in plural.

Figure 10A:
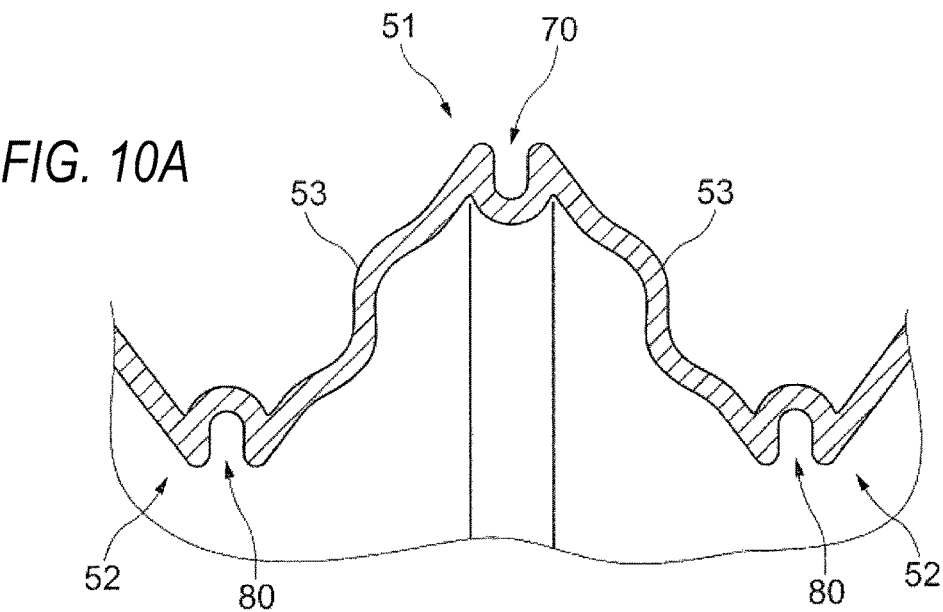
FIGS. 10A and 10B are cross-sectional views of dust covers according to other embodiments.
Figure 10B:
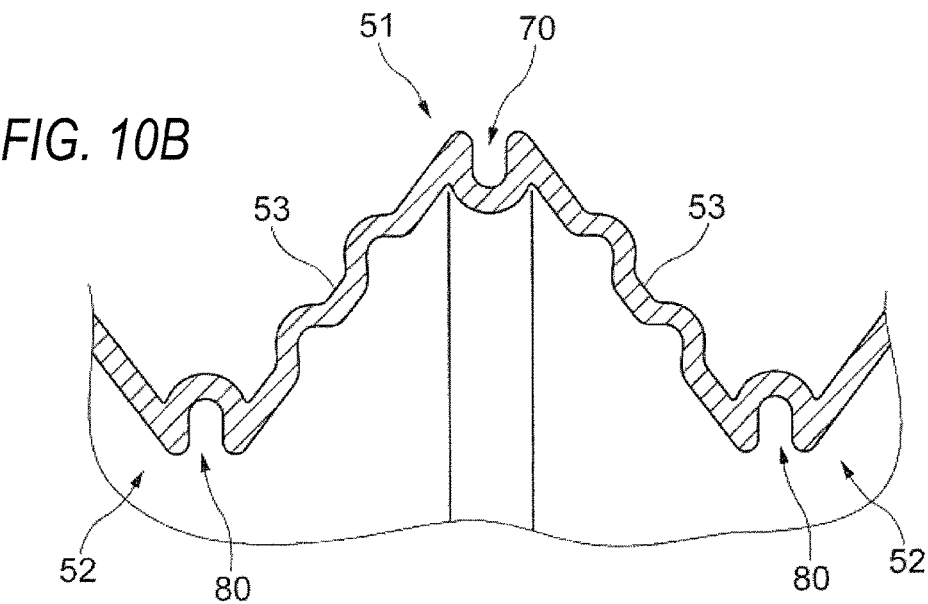

The shape of the coupling portion 53 of the dust cover 50 according to this embodiment will not be limited to a linear shape. For example, as illustrated in FIG. 10A, the coupling portion 53 may be provided with a depression and a protrusion. Alternatively, as illustrated in FIG. 10B, the coupling portion 53 may be provided with a protrusion protruding outward, or the coupling portion 53 may be provided with a depression depressed inward.

In the above-described embodiment, the bellows-shaped cover of a series of alternating peaks 51 and valleys 52 has been described as including the depression 70 on each peak 51 and the protrusion 80 on each valley 52. This configuration, however, will not be particularly limited to the dust cover 50 of the suspension 100. The cover member according to the present invention is not only applicable to the dust cover 50 of the suspension 100 but also applicable to dust prevention parts of, for example, automobiles (of two wheels, four wheels, and so forth), bicycles, construction machines, and hydraulic machines. Similarly, the suspension will not be limited to the suspension with the spring 30 disposed on the outer circumference of dust cover as illustrated in FIG. 1 and FIG. 2. The present invention is also usable to a suspension with the spring 30 disposed at a position other than the outer circumference of the dust cover (specifically, the spring 30 is parallel to the damper).

While in the dust cover 50 of any of the embodiments the inner diameter and the outer diameter (of the dust cover 50) (that is, the positions of the peaks and the valleys in the radial direction) are each uniform, the inner diameter and the outer diameter each may differ partially along the dust cover 50.

What is claimed is:

1. A cover member to cover an object and comprising:
    a plurality of peaks;
    a plurality of valleys; and
    coupling portions coupling the plurality of peaks to the plurality of valleys,
    wherein the cover member is expandable and contractable in an alignment direction in which the plurality of peaks and the plurality of valleys are aligned,
    wherein each peak of the plurality of peaks comprises a depression depressed from an apex of the peak in a direction toward the object, and each valley of the plurality of valleys comprises a protrusion protruding from a bottom of the valley in a direction opposite to the object, each of the coupling portions being connected at the depression and the protrusion,
    wherein the depression has a U-shape in a cross-section, and includes edges of two sides of the U-shape in the direction opposite to the object, and the protrusion has a reverse U-shape in a cross-section, and includes bases of the reverse U-shape in the direction toward the object,
    wherein when the cover member contracts in the alignment direction, the depression of the peak is deformed to enlarge an opening of the depression large enough to make the adjacent edges of adjacent two of the peaks touch each other, and the protrusion of the valley is deformed to enlarge a reverse opening of the protrusion large enough to make the adjacent bases of the adjacent two of the valleys touch each other, and
    wherein connection of the coupling portion to the depression and the protrusion is thicker than a thickness of the coupling portion in a direction perpendicular to an outer surface thereof.

2. The cover member according to claim 1, wherein when the cover member contracts in the alignment direction, a width of the peak in the alignment direction is equal to a width of the valley in the alignment direction.

3. The cover member according to claim 1, wherein when the cover member contracts in the alignment direction, the U-shaped depression deforms into an arcuate shaped depression defined by non-parallel side walls and the reverse U-shaped protrusion deforms into an arcuate shaped protrusion defined by non-parallel sides.

4. The cover member according to claim 3, wherein the U-shaped depression deforms in a direction perpendicular to the U-shaped depression resulting in enlargement of an opening of the U-shaped depression and the reverse U-shaped protrusion deforms in a direction perpendicular to the reverse U-shaped protrusion resulting in enlargement of the bases of the reverse U-shaped protrusion.

5. The cover member according to claim 1, wherein the U-shaped depression is defined by a pair of side walls having parallel inner surfaces in an expanded position of the cover member and the reverse U-shaped protrusion is defined by a pair of side walls having parallel inner surfaces in the expanded position of the cover member.

6. The cover member according to claim 1, wherein in an expanded position of the cover member, adjacent coupling portions extend along axes that intersect one another at a point that is along a center axis that extends along an opening of one of the depression and the protrusion.

7. The cover member according to claim 1, wherein the edges and the bases are formed to have a curved shape.

8. The cover member according to claim 1, wherein the coupling portion has an outer surface that extends linearly.

9. A cover member to cover an object comprising:
a plurality of peaks;
a plurality of valleys; and
coupling portions coupling the plurality of peaks to the plurality of valleys,
wherein the cover member is expandable and contractable in an alignment direction in which the plurality of peaks and the plurality of valleys are aligned,
wherein each peak of the plurality of peaks comprises a depression depressed from an apex of the peak in a direction toward the object, and each valley of the plurality of valleys comprises a protrusion protruding from a bottom of the valley in a direction opposite to the object,
wherein the depression has a U-shape in a cross-section, and includes edges at two sides of the U-shape in the direction opposite to the object, and the protrusion has a reverse U-shape in a cross-section, and includes bases at two sides of the reverse U-shape in the direction toward the object,
wherein when the cover member contracts in the alignment direction, the adjacent edges of two adjacent peaks are in touch with each other, and the adjacent bases of two adjacent valleys are in touch with each other,
wherein the apex is formed at a portion where extensions of outer surfaces of two adjacent coupling portions meet,
wherein the bottom is formed at a portion where extensions of inner surfaces of two adjacent coupling portions meet, and
wherein the depression is connected to the coupling portion at a first connection portion, whose thickness is greater than a thickness of the coupling portion in a direction perpendicular to an outer surface thereof.

10. The cover member according to claim 9, wherein the protrusion is connected to the coupling portion at a second connection portion, whose thickness is greater than the thickness of the coupling portion in the direction perpendicular to the outer surface thereof.

* * * * *